(12) United States Patent
Takaoka (10) Patent No.: US 12,180,675 B2
(45) Date of Patent: Dec. 31, 2024

(54) CONTROL SYSTEM AND METHOD FOR WORK MACHINE

(71) Applicant: KOMATSU LTD., Tokyo (JP)

(72) Inventor: Yukihisa Takaoka, Tokyo (JP)

(73) Assignee: KOMATSU LTD., Tokyo (JP)

( * ) Notice: Subject to any disclaimer, the term of this patent is extended or adjusted under 35 U.S.C. 154(b) by 556 days.

(21) Appl. No.: 17/293,719

(22) PCT Filed: Jan. 20, 2020

(86) PCT No.: PCT/JP2020/001697
§ 371 (c)(1),
(2) Date: May 13, 2021

(87) PCT Pub. No.: WO2020/195044
PCT Pub. Date: Oct. 1, 2020

(65) Prior Publication Data
US 2022/0002966 A1 Jan. 6, 2022

(30) Foreign Application Priority Data

Mar. 28, 2019 (JP) .................................. 2019-063156

(51) Int. Cl.
*E02F 3/84* (2006.01)
*E02F 9/20* (2006.01)
*E02F 9/26* (2006.01)
*G05D 1/00* (2006.01)
(Continued)

(52) U.S. Cl.
CPC .............. *E02F 3/841* (2013.01); *E02F 3/844* (2013.01); *E02F 9/2041* (2013.01);
(Continued)

(58) Field of Classification Search
CPC ....... E02F 9/2045; E02F 9/2041; E02F 3/844; E02F 9/262; E02F 3/842; E02F 3/841;
(Continued)

(56) References Cited

U.S. PATENT DOCUMENTS 5,646,844 A * 7/1997 Gudat .................. G05D 1/0274
701/50
6,236,924 B1 * 5/2001 Motz .................... G05D 1/0274
342/359

(Continued)

FOREIGN PATENT DOCUMENTS

| JP | 2018-45709 A | 3/2018 |
|---|---|---|
| JP | 2019-39280 A | 3/2019 |
| WO | 2018/159434 A1 | 9/2018 |

OTHER PUBLICATIONS

The International Search Report for the corresponding international application No. PCT/JP2020/001697, issued on Feb. 10, 2020.

*Primary Examiner* — Stephen Holwerda
(74) *Attorney, Agent, or Firm* — Global IP Counselors, LLP (57) ABSTRACT

A work machine includes a work implement. A control system for the work machine includes a processor. The processor acquires actual topography data indicative of an actual topography of a work site. The processor acquires work data including a width of a work implement. The processor generates work path data based on the actual topography data and the work data. The work path data indicates positions of a plurality of work paths aligned in a lateral direction. The processer determines a work order of the plurality of work paths based on the work path data. The processer controls a work machine to perform work according to the work paths in the work order.

10 Claims, 12 Drawing Sheets

(51) Int. Cl.
  *G05D 1/02* (2020.01)
  *E02F 3/76* (2006.01)
  *E02F 9/22* (2006.01)

(52) U.S. Cl.
  CPC ............ *E02F 9/2045* (2013.01); *E02F 9/205* (2013.01); *E02F 9/262* (2013.01); *G05D 1/0219* (2013.01); *E02F 3/7609* (2013.01); *E02F 9/2228* (2013.01)

(58) Field of Classification Search
  CPC ....... E02F 9/205; E02F 9/2228; E02F 3/7609; G05D 1/0011; G05D 1/0219; G05D 2201/0202
  See application file for complete search history.

(56) References Cited

U.S. PATENT DOCUMENTS

| | | | |
|---|---|---|---|
| 8,639,393 B2 | 1/2014 | Taylor et al. | |
| 2014/0174770 A1* | 6/2014 | Wei | E02F 3/841 701/27 |
| 2016/0040392 A1* | 2/2016 | Kontz | E02F 3/84 700/275 |
| 2016/0076224 A1* | 3/2016 | Edara | E02F 9/262 701/50 |
| 2017/0153717 A1* | 6/2017 | Moore | G06F 3/0619 |
| 2017/0177002 A1 | 6/2017 | Ogura et al. | |
| 2020/0131740 A1 | 4/2020 | Hashimoto | |
| 2020/0293059 A1* | 9/2020 | Wang | G06V 20/56 |

* cited by examiner

CONTROL SYSTEM AND METHOD FOR WORK MACHINE

This application is a U.S. National stage application of International Application No. PCT/JP2020/001697, filed on Jan. 20, 2020. This U.S. National stage application claims priority under 35 U.S.C. § 119(a) to Japanese Patent Application No. 2019-063156, filed in Japan on Mar. 28, 2019, the entire contents of which are hereby incorporated herein by reference.

BACKGROUND

Field of the Invention

The present disclosure relates to a control system and a method for a work machine.

Background Information

Conventionally, a technique for automatically controlling a work machine such as a bulldozer has been proposed. For example, in U.S. Pat. No. 8,639,393, a controller causes the work machine to move along a work path and causes a work implement to dig a ground surface.

SUMMARY

In the above technique, digging work is repeatedly performed on one work path. Accordingly, the ground surface is gradually dug deeper to form a desired shape. However, the work machine may perform work in order on a plurality of work paths aligned in a lateral direction. In such a case, it is desired to improve the work efficiency. An object of the present disclosure is to efficiently perform work on a plurality of work paths by a work machine.

A control system according to a first aspect is a control system for a work machine including a work implement. The control system includes a processor. The processor acquires actual topography data indicative of an actual topography of a work site. The processor acquires work data including a width of the work implement. The processor generates work path data based on the actual topography data and the work data. The work path data indicates positions of a plurality of work paths aligned in a lateral direction. The processor determines a work order of the plurality of work paths based on the work path data. The processor controls the work machine to perform work according to the work paths in the work order.

A method according to a second aspect is a method executed by a processor in order to control a work machine including a work implement. The method includes the following processes. A first process is to acquire actual topography data indicative of an actual topography of a work site. A second process is to acquire work data including a width of the work implement. A third process is to generate work path data based on the actual topography data and the work data. The work path data indicates positions of a plurality of work paths aligned in a lateral direction. A fourth process is to determine a work order of the plurality of work paths based on the work path data. A fifth process is to control the work machine to perform work according to the work paths in the work order.

According to the present disclosure, the work order of the plurality of work paths is determined based on the work path data. Accordingly, work on the plurality of work paths can be performed efficiently by the work machine.

DETAILED DESCRIPTION OF EMBODIMENT(S)

Figure 1:
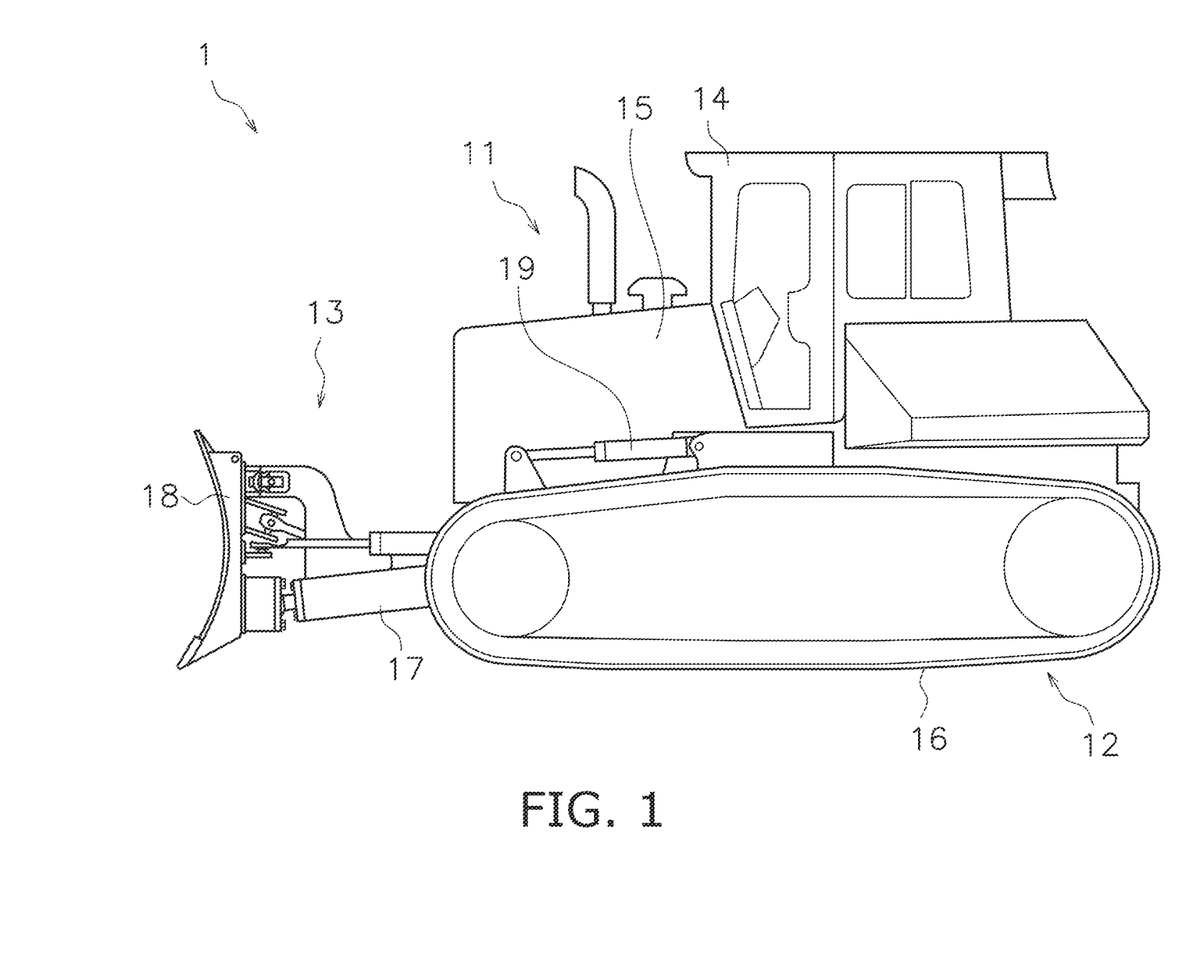
FIG. 1 is a side view of a work machine according to an embodiment.

A work vehicle according to an embodiment is described below with reference to the drawings. FIG. 1 is a side view of a work machine 1 according to the embodiment. The work machine 1 according to the present embodiment is a bulldozer. The work machine 1 includes a vehicle body 11, a travel device 12, and a work implement 13.

The vehicle body 11 includes an operating cabin 14 and an engine compartment 15. An operator's seat that is not illustrated is disposed in the operating cabin 14. The travel device 12 is attached to the vehicle body 11. The travel device 12 includes a pair of left and right crawler belts 16. Only the left crawler belt 16 is illustrated in FIG. 1. The work machine 1 travels due to the rotation of the crawler belts 16.

The work implement 13 is attached to the vehicle body 11. The work implement 13 includes a lift frame 17, a blade 18, and a lift cylinder 19. The lift frame 17 is attached to the vehicle body 11 such as to be movable up and down. The lift frame 17 supports the blade 18. The blade 18 moves up and down accompanying the movements of the lift frame 17. The lift frame 17 may be attached to the travel device 12. The lift cylinder 19 is connected to the vehicle body 11 and the lift frame 17. Due to the extension and contraction of the lift cylinder 19, the lift frame 17 moves up and down.

Figure 2:
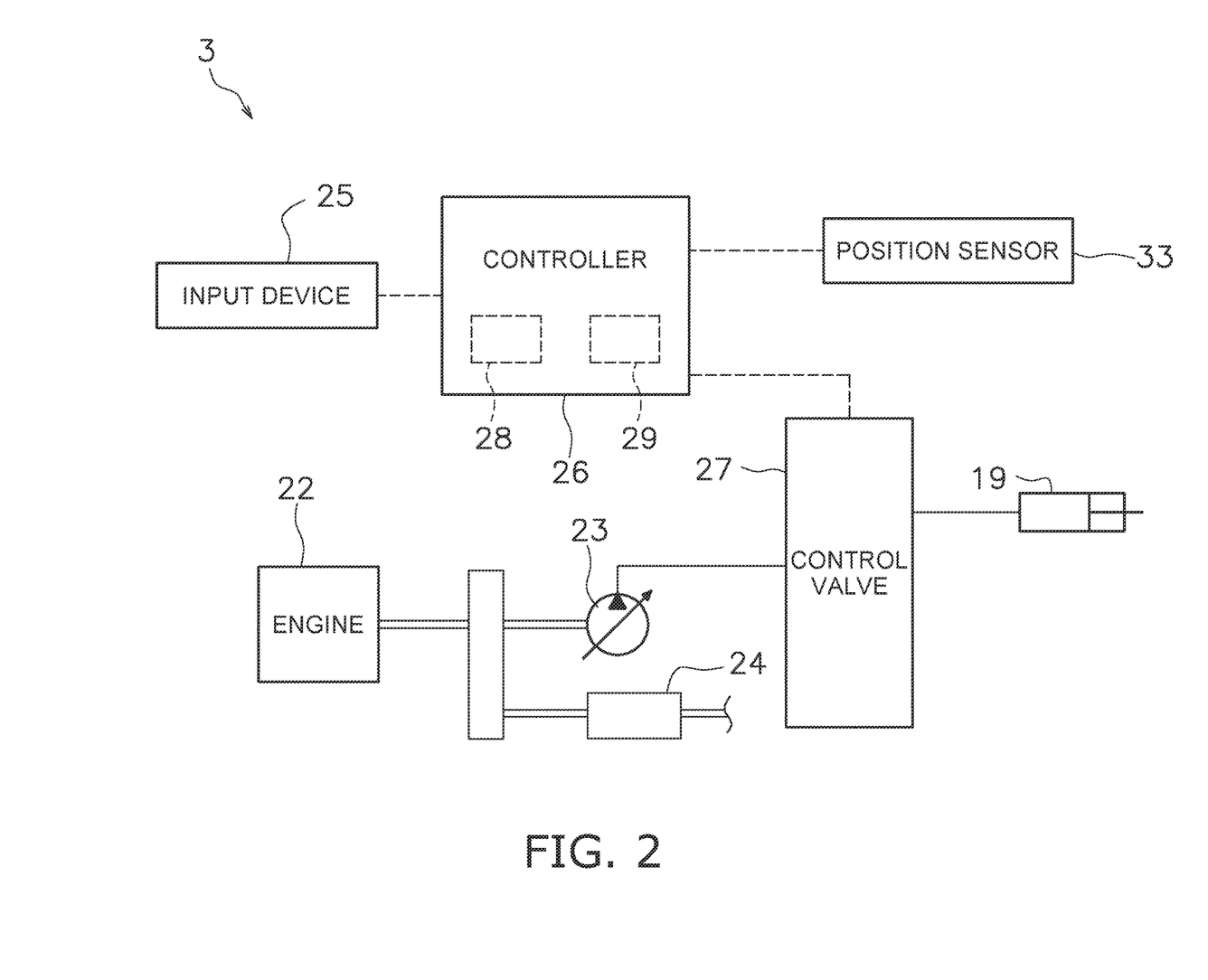
FIG. 2 is a block diagram of a configuration of a control system for the work machine.

FIG. 2 is a block diagram of a configuration of a control system 3 of the work machine 1. In the present embodiment, the control system 3 is mounted on the work machine 1. As illustrated in FIG. 2, the work machine 1 includes an engine 22, a hydraulic pump 23, and a power transmission device 24. The hydraulic pump 23 is driven by the engine 22 to discharge hydraulic fluid. The hydraulic fluid discharged from the hydraulic pump 23 is supplied to the lift cylinder 19. Although one hydraulic pump 23 is illustrated in FIG. 2, a plurality of hydraulic pumps may be provided.

The power transmission device 24 transmits driving force of the engine 22 to the travel device 12. The power transmission device 24 may be a hydro static transmission (HST), for example. Alternatively, the power transmission device 24 may be, for example, a transmission having a torque converter or a plurality of transmission gears.

The control system 3 includes an input device 25, a controller 26, and a control valve 27. The input device 25 is disposed in the operating cabin 14. The input device 25 is configured to be operated by an operator. The input device outputs an operation signal according to operation by the operator. The input device 25 outputs the operation signal to the controller 26.

The input device 25 includes an operating element such as an operating lever, a pedal, a switch, or the like for operating the travel device 12 and the work implement 13. The input device 25 may include a touch screen. The travel of the work machine 1 such as forward or reverse is controlled according to the operation of the input device 25. The movement of the work implement 13 such as raising or lowering is controlled according to the operation of the input device 25.

The controller 26 is programmed to control the work machine 1 based on acquired data. The controller 26 includes a storage device 28 and a processor 29. The storage device 28 includes a non-volatile memory such as a ROM and a volatile memory such as a RAM. The storage device 28 may include an auxiliary storage device such as a hard disk or a solid state drive (SSD). The storage device 28 is an example of a non-transitory computer-readable recording medium. The storage device 28 stores computer commands and data for controlling the work machine 1.

The processor 29 is, for example, a central processing unit (CPU). The processor 29 executes processes for controlling the work machine 1 according to a program. The controller 26 controls the travel device 12 or the power transmission device 24, thereby causing the work machine 1 to travel. The controller 26 controls the control valve 27, thereby causing the blade 18 to move up and down.

The control valve 27 is a proportional control valve and is controlled according to a command signal from the controller 26. The control valve 27 is disposed between a hydraulic actuator such as the lift cylinder 19 and the hydraulic pump 23. The control valve 27 controls the flow rate of the hydraulic fluid supplied from the hydraulic pump 23 to the lift cylinder 19. The controller 26 generates a command signal to the control valve 27 so that the blade 18 operates. As a result, the lift cylinder 19 is controlled. The control valve 27 may be a pressure proportional control valve. Alternatively, the control valve 27 may be an electromagnetic proportional control valve.

As illustrated in FIG. 2, the control system 3 includes a position sensor 33. The position sensor 33 includes a global navigation satellite system (GNSS) receiver such as global positioning system (GPS). The position sensor 33 receives a positioning signal from a satellite and acquires current position data from the positioning signal. The current position data indicates a position of the work machine 1. The position sensor 33 outputs the current position data to the controller 26.

Figure 3:
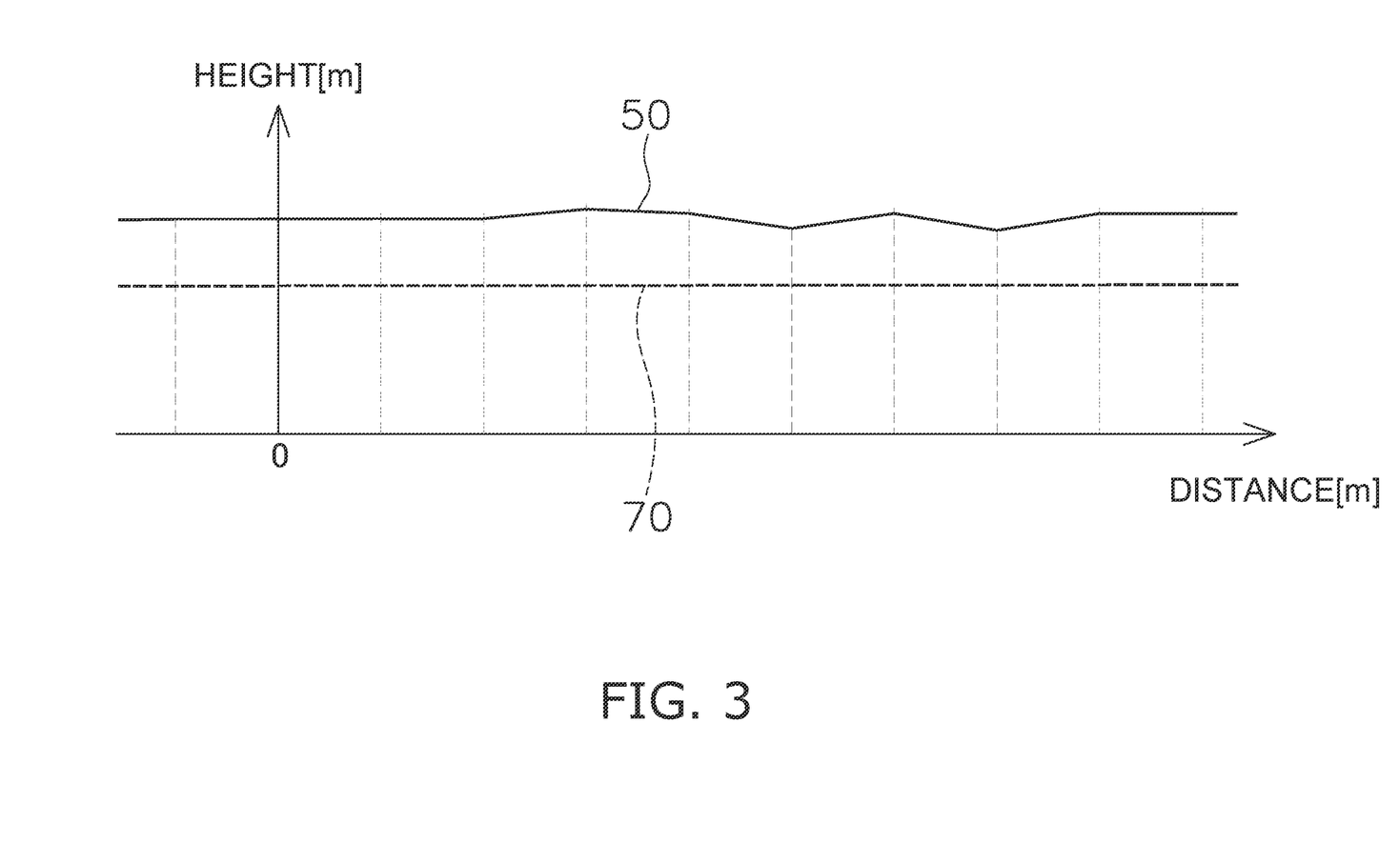
FIG. 3 is a side view illustrating actual topography data.

The controller 26 acquires actual topography data. The actual topography data indicates an actual topography of a work site. The actual topography data indicates a three-dimensional survey map of the actual topography. FIG. 3 is a side view of an actual topography 50. In FIG. 3, the vertical axis indicates a height of the topography. The horizontal axis indicates a distance from a current position of the work machine 1 in the traveling direction. The actual topography data indicates the heights at a plurality of points on the actual topography.

The initial actual topography data is stored in the storage device 28 in advance. For example, the initial actual topography data may be acquired using laser measurement. The controller 26 acquires the latest actual topography data while the work machine 1 is moving and updates the actual topography data. Specifically, the controller 26 acquires the heights at a plurality of points on the actual topography 50 where the crawler belts 16 have passed. Alternatively, the controller 26 may acquire the latest actual topography data from an external device of the work machine 1. Next, automatic control of the work machine 1 executed by the controller 26 will be described. The automatic control of the work machine 1 may be semi-automatic control performed in combination with manual operation by the operator. Alternatively, the automatic control of the work machine 1 may be fully automatic control performed without manual operation by the operator.

Figure 4:
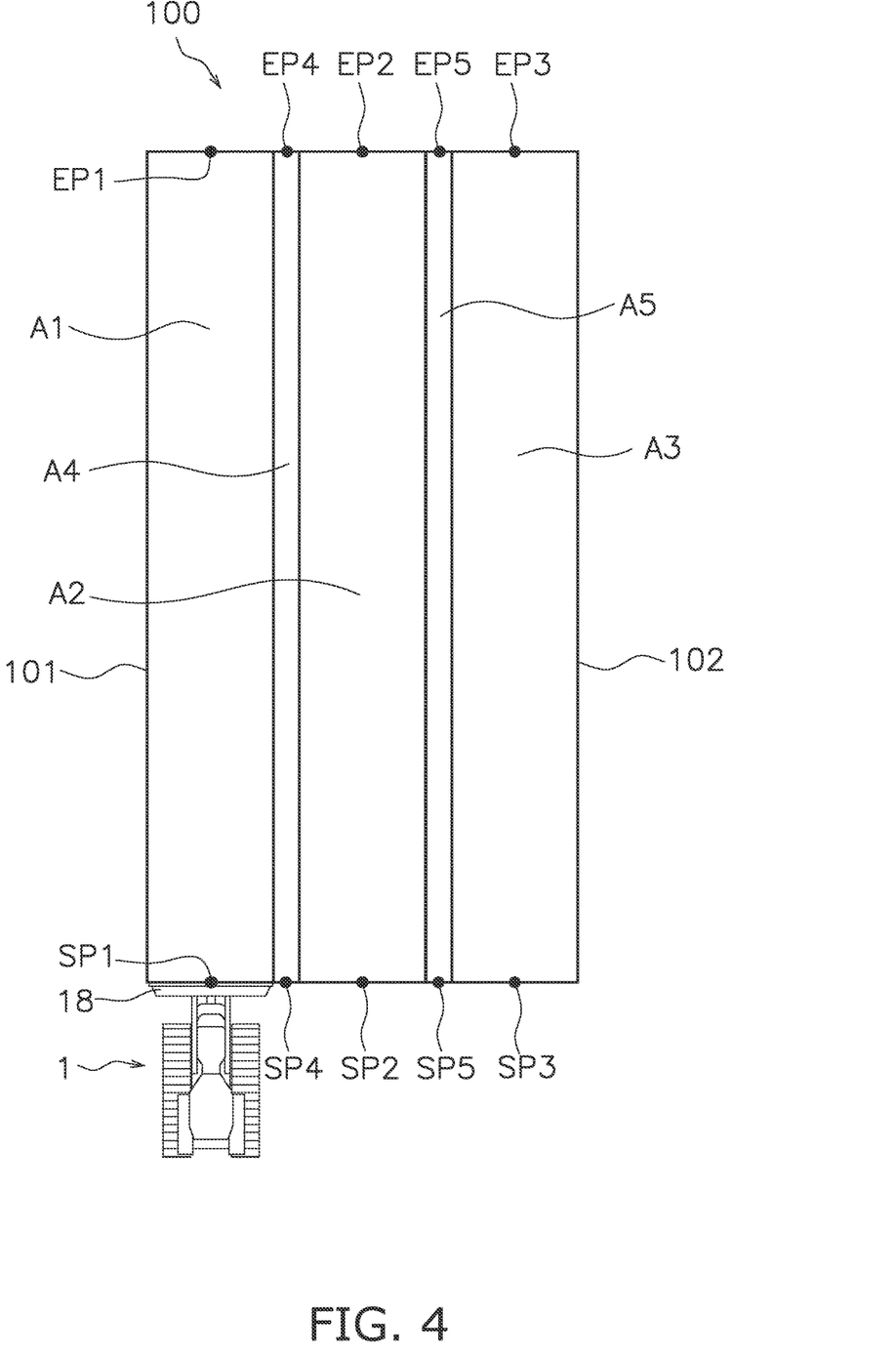
FIG. 4 is a top view of a work area of the work machine.

FIG. 4 is a top view of a work area 100 of the work machine 1. As illustrated in FIG. 4, the work area 100 includes a plurality of work paths A1 to A5. The plurality of work paths A1 to A5 are aligned in a lateral direction. The plurality of work paths A1 to A5 include a first to fifth work paths. The first to third work paths A1 to A3 are slots. The fourth and fifth work paths A4 and A5 are digging walls.

The work machine 1 performs digging with the work implement 13 while moving along the plurality of work paths A1 to A5 in order. A direction in which the plurality of work paths A1 to A5 extend is referred to as a front-rear direction. A direction in which the plurality of work paths A1 to A5 are aligned is referred to as a lateral direction. In other words, the lateral direction is the direction perpendicular to the direction in which the work paths A1 to A5 extend.

Figure 5:
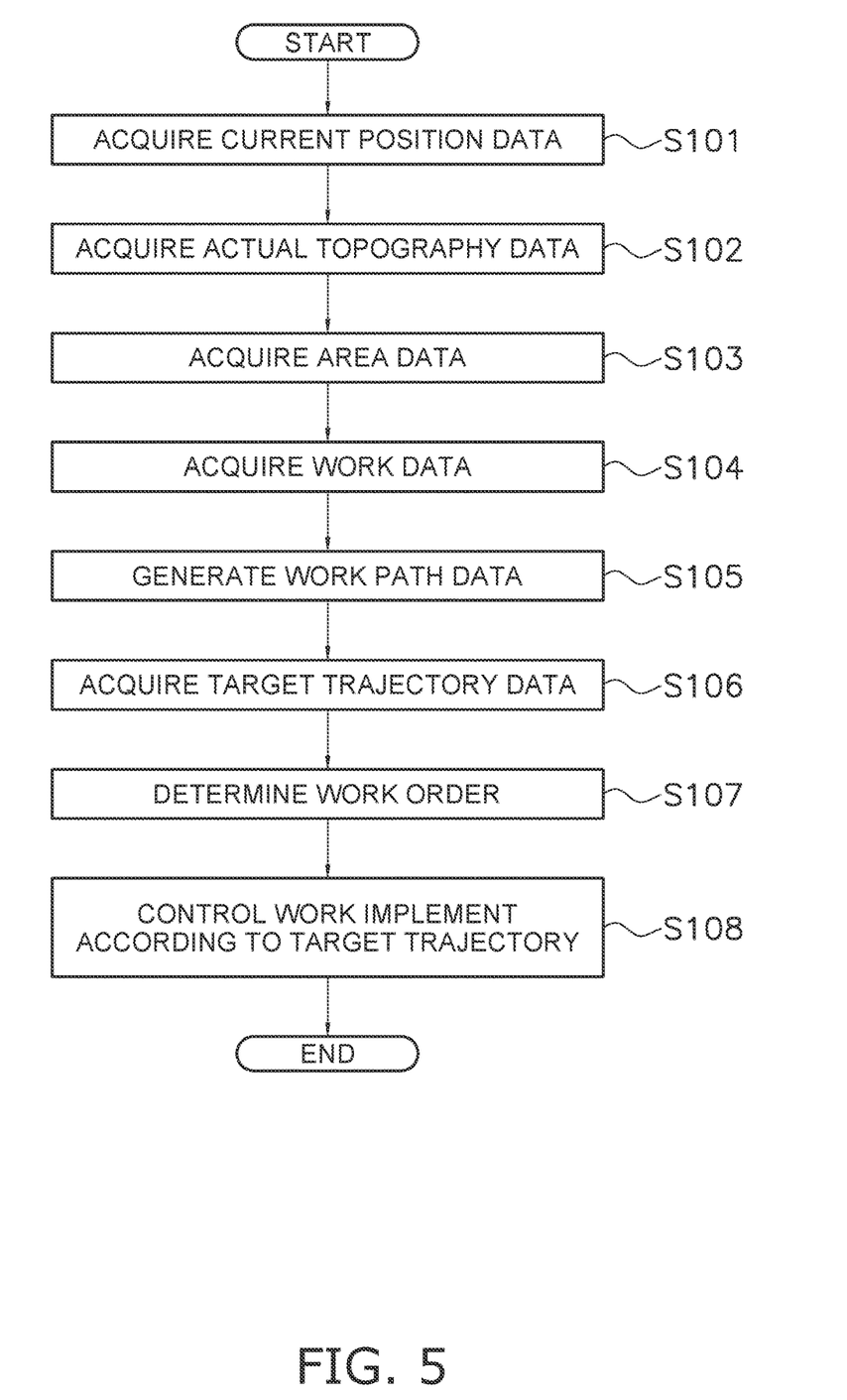
FIG. 5 is a flowchart illustrating processes of automatic control executed by a controller.

FIG. 5 is a flowchart illustrating processes of automatic control executed by the controller 26. As illustrated in FIG. 5, in step S101, the controller 26 acquires the current position data. In step S102, the controller 26 acquires the actual topography data. For example, the controller 26 reads out, from the storage device 28, the actual topography data of a predetermined range at a work site including the work area 100.

In step S103, the controller 26 acquires area data. The area data indicates a position and a range of the work area 100. The work area 100 includes a first end 101 and a second end 102. The first end 101 is one end of the work area 100 in the lateral direction. The second end 102 is the other end of the work area 100 in the lateral direction. The work area 100 is a range of a predetermined length between the first end 101 and the second end 102. The controller 26 acquires the area data from the storage device 28. Alternatively, the controller 26 may acquire the area data from an external device.

In step S104, the controller 26 acquires work data. The work data includes a width of a slot and a width of a digging wall. The width of the slot and the width of the digging wall are determined according to a width of the blade 18. The width of the slot is approximately the same as the width of the blade 18. The width of the digging wall is smaller than the width of the blade 18. The controller 26 acquires the work data from the storage device 28. Alternatively, the controller 26 may acquire the work data from an external device.

In step S105, the controller 26 generates work path data. The work path data indicates positions of the plurality of work paths A1 to A5. The controller 26 generates the work path data based on the actual topography data and the work data. Specifically, the work path data includes positions of the plurality of slots A1 to A3 and the plurality of digging walls A4 and A5.

The work path data includes start positions SP1 to SP3 of work in the plurality of slots A1 to A3, respectively, and includes end positions EP1 to EP3 of work in the plurality of slots A1 to A3, respectively. The work path data includes start positions SP4 and SP5 of work in the plurality of digging walls A4 and A5, respectively, and includes end positions EP4 and EP5 of work in the plurality of digging walls A4 and A5, respectively. Further, the work path data includes type data indicating a type of work performed by the work machine 1. The type data includes digging of the slots A1 to A3 and digging of the digging walls A4 and A5.

For example, as illustrated in FIG. 4, the plurality of slots A1 to A3 include a first slot A1, a second slot A2, and a third slot A3. The first slot A1 is the closest to the first end 101 of the work area 100 among the plurality of slots A1 to A3. The second slot A2 is the closest to the first slot A1 among the plurality of slots A1 to A3. The third slot A3 is a farthest slot that is the farthest from the first slot A1 among the plurality of slots A1 to A3. In other words, the third slot A3 is the closest to the second end 102 of the work area 100 among the plurality of slots A1 to A3.

The plurality of digging walls A4 and A5 include a first digging wall A4 and a second digging wall A5. The first digging wall A4 is the closest to the first slot A1 between the plurality of digging walls A4 and A5. The second digging wall A5 is a farthest digging wall that is the farthest from the first slot A1 between the plurality of digging walls A4 and A5. In other words, the second digging wall A5 is the closest to the third slot A3 that is the farthest slot, between the plurality of digging walls A4 and A5.

In FIG. 4, the work area 100 includes the three slots A1 to A3 and the two digging walls A4 and A5. However, the number of the slots A1 to A3 may be less than three or greater than three. The number of the digging walls A4 and A5 may be one or greater than two.

In step S106, the controller 26 acquires target trajectory data indicative of a target trajectory 70. As illustrated in FIG. 3, at least a portion of the target trajectory 70 is positioned below the actual topography 50. The target trajectory 70 indicates a target trajectory of a tip of the blade 18 in work. In FIG. 3, the entire target trajectory 70 is positioned below the actual topography 50. However, a portion of the target trajectory 70 may be positioned at the same height as the actual topography 50 or above the actual topography 50.

For example, the controller 26 determines, as the target trajectory 70, a surface positioned below the actual topography 50 by a predetermined distance. However, the method for determining the target trajectory 70 is not limited to this and may be changed. For example, the controller 26 may determine, as the target trajectory 70, a topography displaced by a predetermined distance downward from the actual topography 50. As illustrated in FIG. 3, the target trajectory 70 may be horizontal in a side sectional view. Alternatively, the target trajectory 70 may be inclined with respect to the front-rear direction in the side sectional view.

Figure 6:
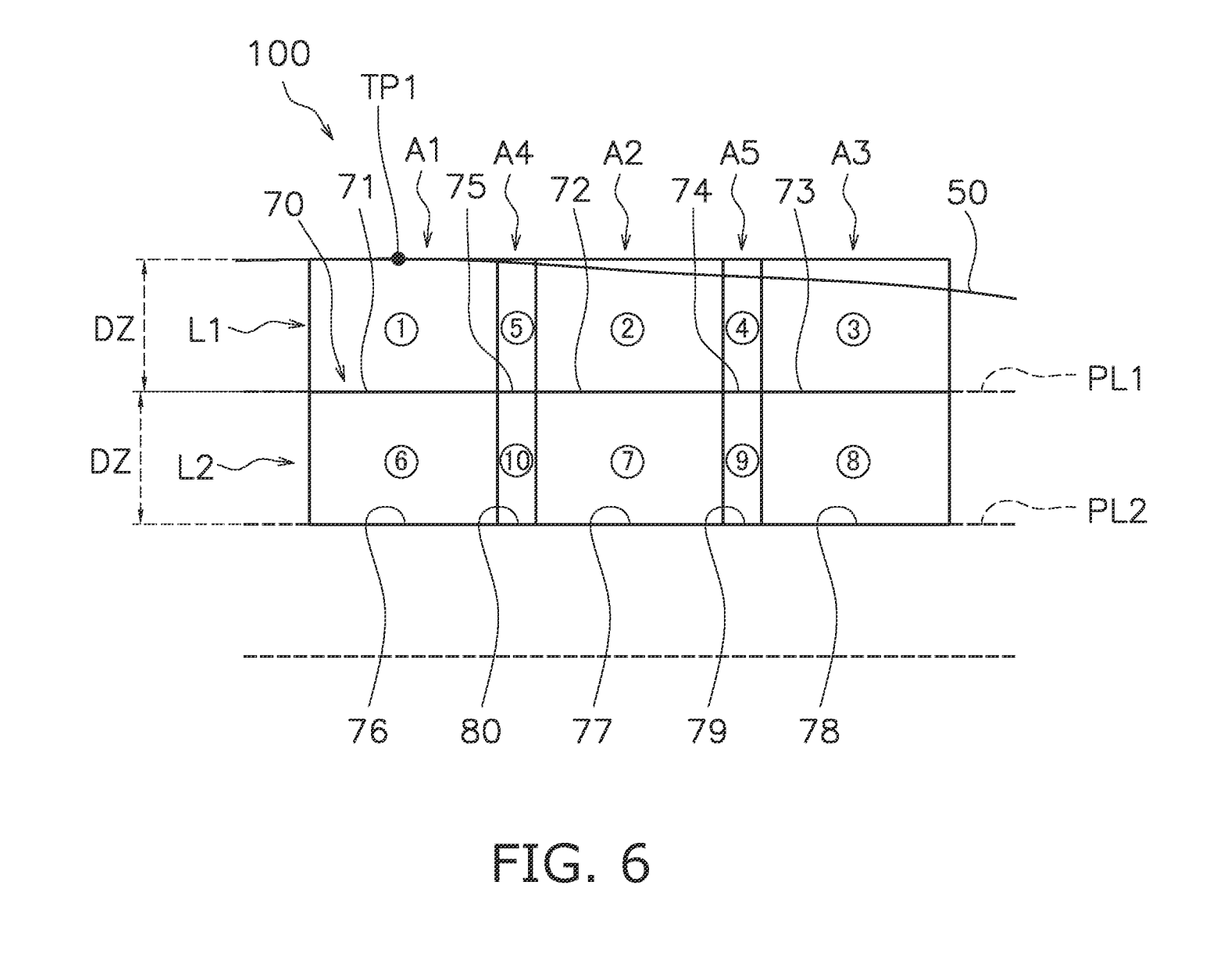
FIG. 6 is a front sectional view of the work area.

FIG. 6 is a front sectional view of the work area 100. As illustrated in FIG. 6, the target trajectory 70 includes a plurality of target trajectories 71 to 75. The controller 26 determines the target trajectories 71 to 75 for the plurality of work paths A1 to A5, respectively, so that the target trajectories 71 to 75 are positioned on a same virtual surface PL1 in the lateral direction. The target trajectories 71 to 75 are horizontal in the front sectional view. Therefore, the controller 26 determines the target trajectories 71 to 75 positioned at the same height in the lateral direction for the plurality of slots A1 to A3 and the plurality of digging walls A4 and A5.

Specifically, the virtual surface PL1 is a horizontal surface positioned below an apex TP1 of the actual topography 50 in the work area 100 by a predetermined distance DZ. Therefore, the controller 26 determines, as the target trajectories 71 to 75, a horizontal surface positioned below the apex TP1 of the actual topography 50 in the work area 100 by the predetermined distance DZ. The controller 26 determines the target trajectories for the plurality of work paths A1 to A5 in each of a plurality of layers L1 and L2 positioned below a surface of the actual topography 50. Specifically, the controller 26 determines the target trajectories 71 to 75 for the plurality of slots A1 to A3 and the plurality of digging walls A4 and A5 in a first layer L1. The first layer L1 is positioned below the surface of the actual topography 50.

The controller 26 determines target trajectories 76 to 80 for the plurality of slots A1 to A3 and the plurality of digging walls A4 and A5 in a second layer L2. The second layer L2 is positioned below the first layer L1. The controller 26 determines the target trajectories 76 to 80 for the plurality of work paths A1 to A5, respectively, so that the target trajectories 76 to 80 are positioned on a same virtual surface PL2 in the lateral direction. The virtual surface PL2 is a horizontal surface positioned below the virtual surface PL1 by the predetermined distance DZ. Therefore, the controller 26 determines the target trajectories 76 to 80 positioned at the same height in the lateral direction for the plurality of slots A1 to A3 and the plurality of digging walls A4 and A5.

In step S107, the controller 26 determines a work order. The controller 26 determines the work order of the plurality of work paths A1 to A5 based on the work path data. The controller 26 determines the work order of the work paths A1 to A5 in order from the upper layer between the plurality of layers L1 and L2. Further, the controller 26 determines the work order so that the work on the digging walls A4 and A5 is performed after the work on the plurality of slots A1 to A3 in the work area 100.

Specifically, the controller 26 determines the work order of the plurality of slots A1 to A3 in the first layer L1 from the first slot A1 to the third slot A3 in order from the closest to the first slot A1. After the third slot A3, the controller 26 determines the work order of the plurality of digging walls A4 and A5 from the second digging wall A5 to the first digging wall A4 in order from the closest to the second digging wall A5.

After the first digging wall A4 in the first layer, the controller 26 determines the work order so that work is performed on the first slot A1 in the second layer L2. The controller 26 determines the work order of the plurality of slots A1 to A3 in the second layer L2 from the first slot A1 to the third slot A3 in order from the closest to the first slot A1. After the third slot A3, the controller 26 determines the work order of the plurality of digging walls A4 and A5 from the second digging wall A5 to the first digging wall A4 in order from the closest to the second digging wall A5.

Therefore, as indicated by the circled numbers in FIG. 6, the controller 26 determines the work order in the order of the first slot A1 in the first layer L1, the second slot A2 in the first layer L1, the third slot A3 in the first layer L1, the second digging wall A5 in the first layer L1, the first digging wall A4 in the first layer L1, the first slot A1 in the second layer L2, the second slot A2 in the second layer L2, the third slot A3 in the second layer L2, the second digging wall A5 in the second layer L2 and the first digging wall A4 in the second layer L2.

In step S108, the controller 26 causes the work implement 13 to operate according to the target trajectory 70. The controller 26 generates a command signal to the work implement 13 so that a position of the tip of the blade 18 moves according to the target trajectory 70. The controller 26 outputs the command signal to the control valve 27. As a result, the work implement 13 operates according to the target trajectory 70.

The controller 26 controls the work machine 1 so that the work implement 13 moves according to the target trajectory 70 for each of the plurality of work paths A1 to A5 in the work order determined in step S107. Therefore, in the first layer L1, the controller 26 causes the work implement 13 to move in order of the target trajectory 71 for the first slot A1, the target trajectory 72 for the second slot A2, the target trajectory 73 for the third slot A3, the target trajectory 74 for the second digging wall A5, and the target trajectory 75 for the first digging wall A4.

Next, in the second layer L2, the controller 26 causes the work implement 13 to move in order of the target trajectory 76 for the first slot A1, the target trajectory 77 for the second slot A2, the target trajectory 78 for the third slot A3, the target trajectory 79 for the second digging wall A5, and the target trajectory 80 for the first digging wall A4. The work machine 1 causes the work implement 13 to operate according to the target trajectory 70 while traveling forward along each of the work paths A1 to A5. As a result, the actual topography 50 is dug with the work implement 13.

The controller 26 updates the actual topography 50 data. For example, the controller 26 acquires the heights at a plurality of points on the actual topography 50 where the crawler belts 16 have passed during traveling of the work machine 1. The controller 26 updates the actual topography 50 data according to the heights at the plurality of points acquired during traveling. Alternatively, the controller 26 may update the actual topography 50 data according to the actual topography 50 measured by an external device. Alternatively, the work machine 1 may include a measuring device such as light detection and ranging (LiDAR) device, for example. The controller 26 may update the actual topography 50 data based on the actual topography 50 measured by the measuring device.

Figure 7:
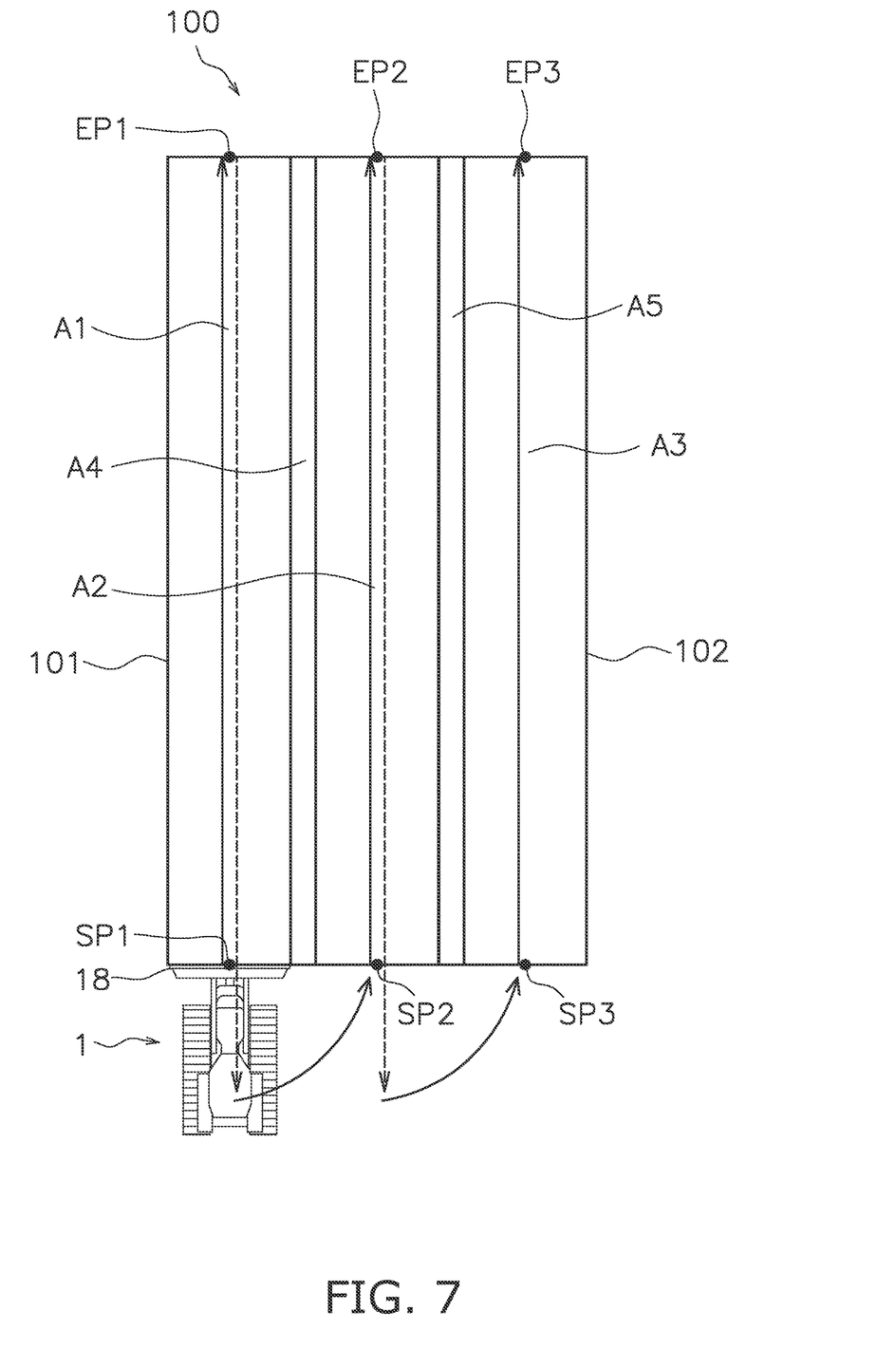
FIG. 7 is a top view of the work area illustrating work along a work path.

FIGS. 7 to 10 are top views of the work area 100 illustrating work along the work paths A1 to A5 in the first layer L1. As illustrated in FIG. 7, the controller 26 causes the work machine 1 to travel forward from the start position SP1 in the first slot A1 along the first slot A1 and causes the work implement 13 to move according to the target trajectory 71 for the first slot A1. As a result, the first slot A1 is dug.

After the work machine 1 reaches the end position EP1 in the first slot A1, the controller 26 causes the work machine 1 to travel reverse along the first slot A1. Next, the controller 26 causes the work machine 1 to move to the start position SP2 in the second slot A2. The controller 26 causes the work machine 1 to travel forward from the start position SP2 in the second slot A2 along the second slot A2 and causes the work implement 13 to move according to the target trajectory 72 for the second slot A2. As a result, the second slot A2 is dug.

After the work machine 1 reaches the end position EP2 in the second slot A2, the controller 26 causes the work machine 1 to travel reverse along the second slot A2. Next, the controller 26 causes the work machine 1 to move to the start position SP3 in the third slot A3. The controller 26 causes the work machine 1 to travel forward from the start position SP3 in the third slot A3 along the third slot A3 and causes the work implement 13 to move according to the target trajectory 73 for the third slot A3. As a result, the third slot A3 is dug.

Figure 8:
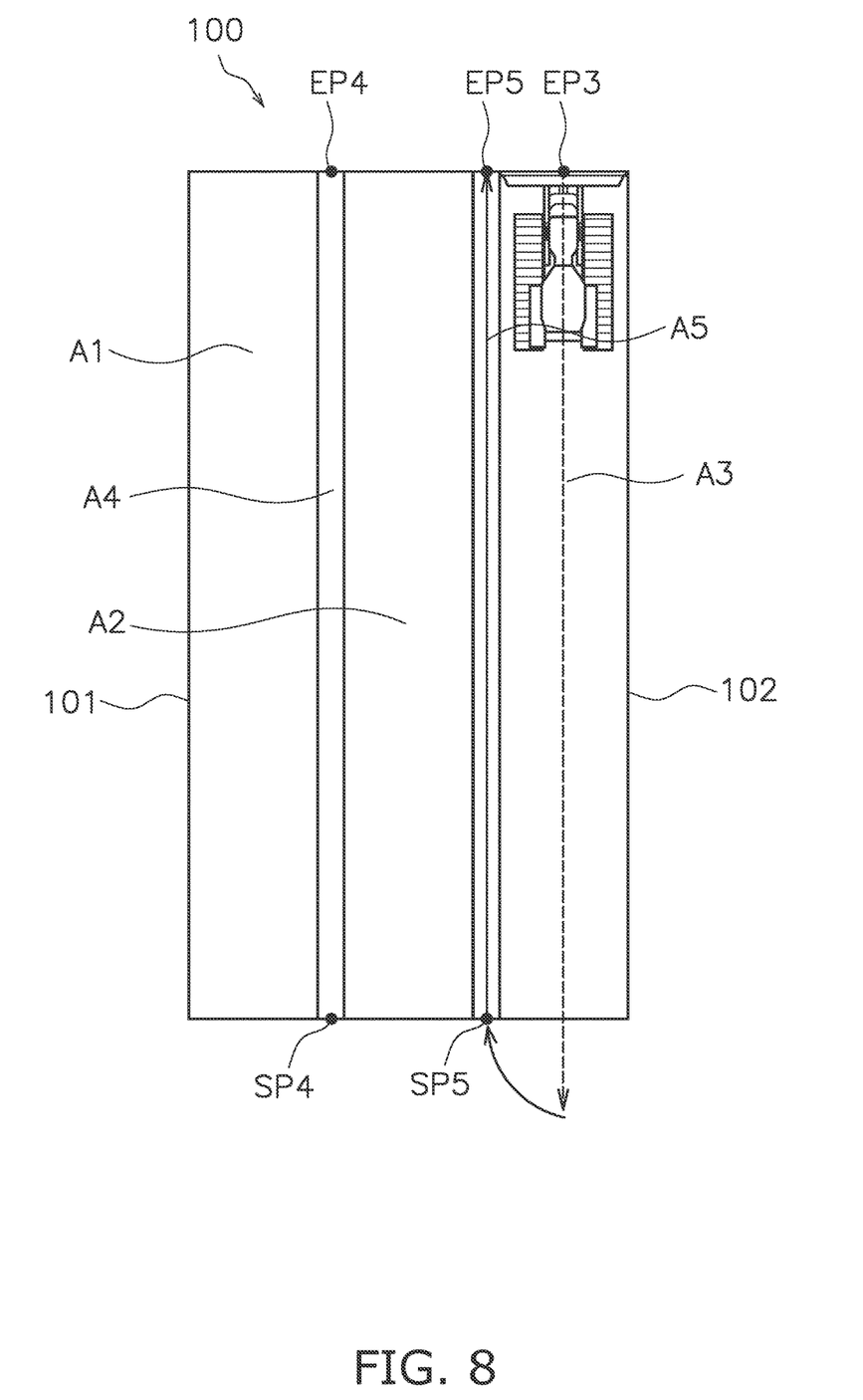
FIG. 8 is a top view of the work area illustrating work along the work path.

As illustrated in FIG. 8, after the work machine 1 reaches the end position EP3 in the third slot A3, the controller 26 causes the work machine 1 to travel reverse along the third slot A3. Next, the controller 26 causes the work machine 1 to move to the start position SP5 in the second digging wall A5. The controller 26 causes the work machine 1 to travel forward from the start position SP5 in the second digging wall A5 along the second digging wall A5 and causes the work implement 13 to move according to the target trajectory 74 for the second digging wall A5. As a result, the second digging wall A5 is dug.

Figure 9:
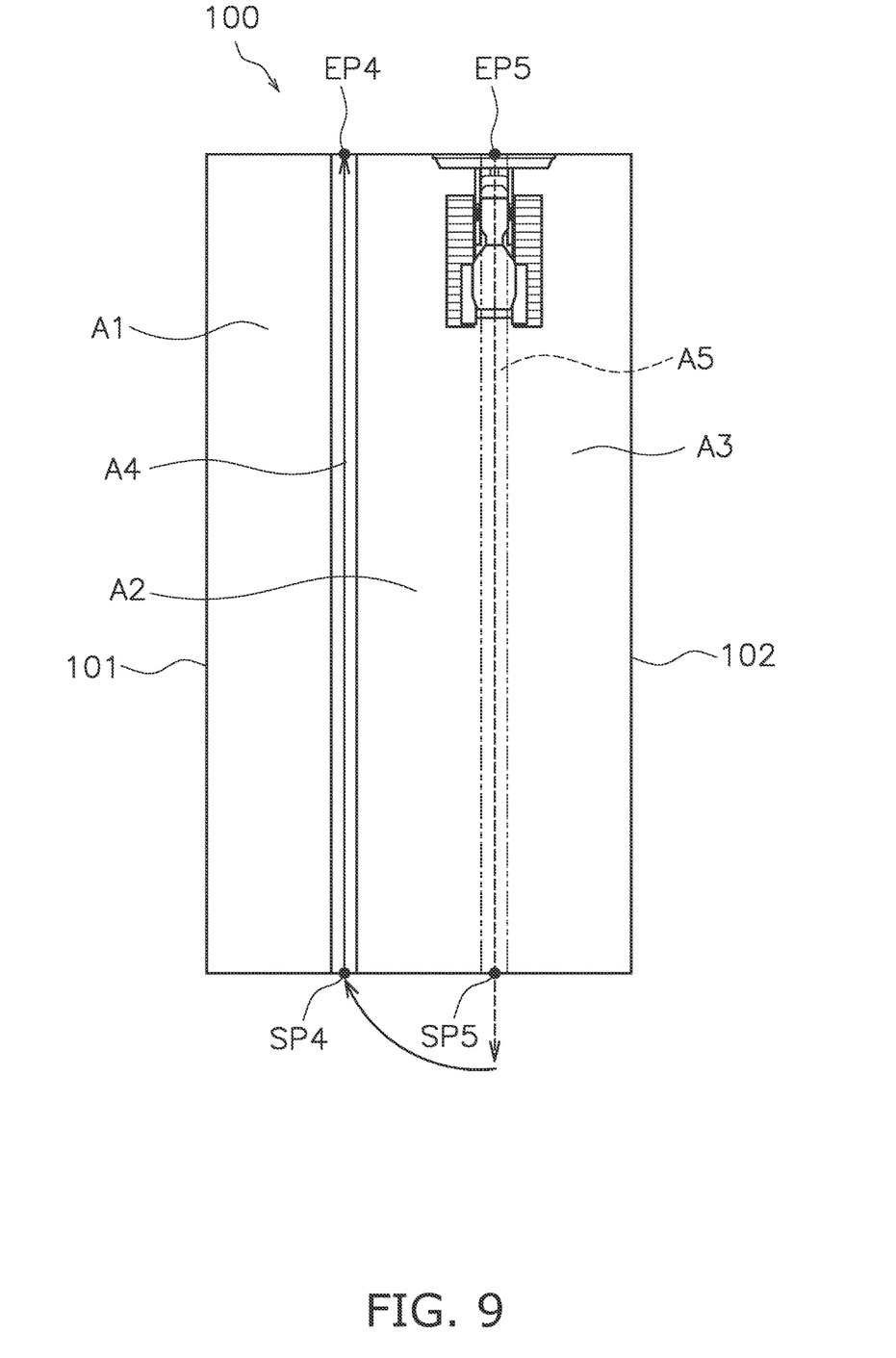
FIG. 9 is a top view of the work area illustrating work along the work path.

After the work machine 1 reaches the end position EP5 in the second digging wall A5, the controller 26 causes the work machine 1 to move to the start position SP4 in the first digging wall A4. At this time, as illustrated in FIG. 9, the controller 26 may cause the work machine 1 to move to the start position SP4 in the first digging wall A4, after causing the work machine 1 to travel reverse along a route at digging of the second digging wall A5. Alternatively, as illustrated in FIG. 10, the controller 26 may causes the work machine 1 to move from the end position EP5 in the second digging wall A5 to the start position SP4 in the first digging wall A4 by the shortest route.

Figure 10:
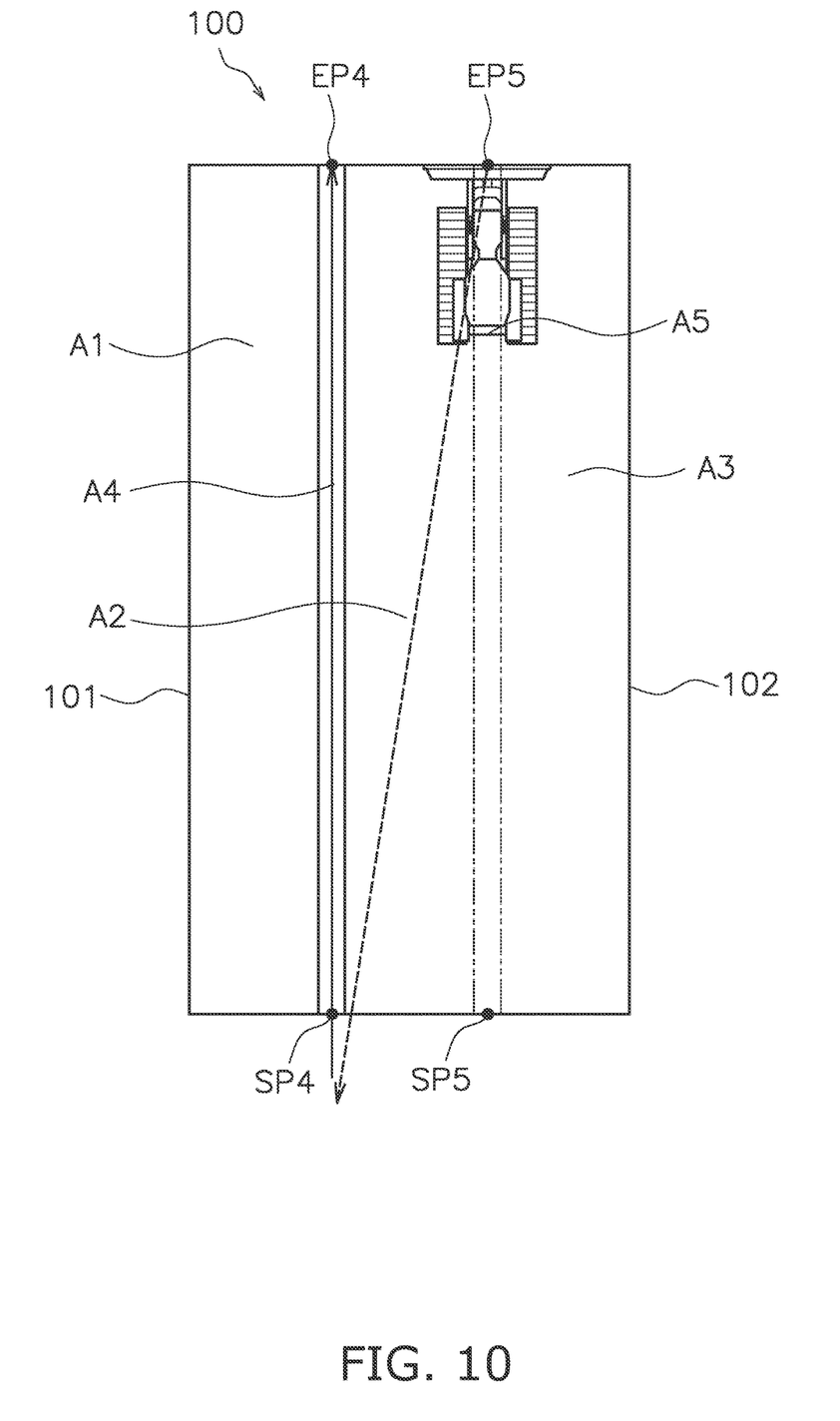
FIG. 10 is a top view of the work area illustrating work along the work path.

As illustrated in FIG. 9 or FIG. 10, the controller 26 causes the work machine 1 to travel forward from the start position SP4 in the first digging wall A4 along the first digging wall A4 and causes the work implement 13 to move according to the target trajectory 75 for the first digging wall A4. As a result, the first digging wall A4 is dug.

The work according to the work paths in the first layer L1 has been described above and the controller 26 also controls the work machine 1 for work according to the work paths in the second layer L2 in the same manner as described above. The controller 26 may perform the same work as described above on a work path in a layer below the second layer.

In the control system 3 of the work machine 1 according to the present embodiment described above, the work order of the plurality of work paths A1 to A5 is determined based on the work path data. Accordingly, the work on the plurality of work paths A1 to A5 can be performed efficiently by the work machine 1.

Although one embodiment has been described above, the present invention is not limited to the above embodiment and various modifications can be made without departing from the gist of the invention.

The work machine 1 is not limited to the bulldozer and may be another vehicle such as a wheel loader, a motor grader, a hydraulic excavator, or the like. The work machine 1 may be a vehicle driven by an electric motor. In this case, the engine 22 and the engine compartment 15 may be omitted.

The controller 26 may have a plurality of controllers separated from one another. The abovementioned processes may be distributed and executed among the plurality of controllers. The controller 26 may have a plurality of processors. The abovementioned processes may be distributed and executed among the plurality of processors.

Figure 11:
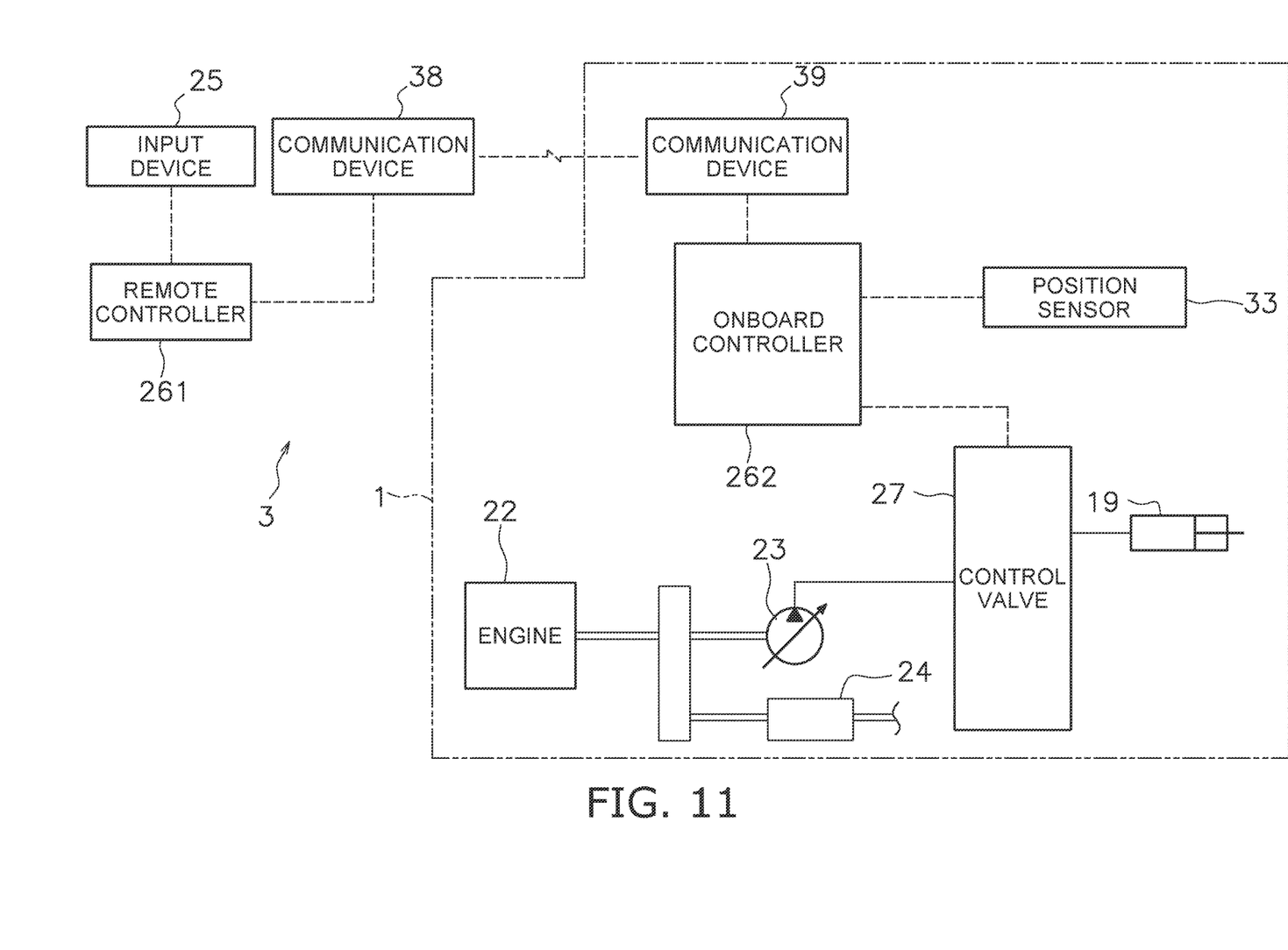
FIG. 11 is a block diagram of a configuration of a control system for the work machine according to a modified example.

The work machine 1 may be a vehicle that can be remotely operated. In this case, a portion of the control system 3 may be disposed outside the work machine 1. For example, as illustrated in FIG. 11, the controller 26 may include a remote controller 261 and an onboard controller 262. The remote controller 261 may be disposed outside the work machine 1. For example, the remote controller 261 may be disposed at a management center outside the work machine 1. The onboard controller 262 may be mounted on the work machine 1. The input device 25 may be disposed outside the work machine 1. The input device 25 may be omitted from the work machine 1. In this case, the operating cabin may be omitted from the work machine 1.

The remote controller 261 and the onboard controller 262 may be able to communicate wirelessly via the communication devices 38 and 39. Some of the aforementioned functions of the controller 26 may be executed by the remote controller 261 and the remaining functions may be executed by the onboard controller 262. For example, the processes of generating the work path data, the processes of determining the target trajectory 70, and the processes of determining the work order may be executed by the remote controller 261. The processes of outputting the command signal to the work implement 13 may be executed by the onboard controller 262.

The method for determining the target trajectory 70 is not limited to that of the above embodiment and may be changed. For example, the target trajectories 71 to 75 may be inclined with respect to the lateral direction in the front sectional view. That is, the virtual surface PL1 may be inclined with regard to the lateral direction. Alternatively, the target trajectories 71 to 75 may not be positioned on the virtual surface PL1. For example, the target trajectories 71 to 75 may be positioned at different heights from each other. The above described for the target trajectories 71 to 75 applies to the target trajectories 76 to 80.

The work path data is not limited to that of the above embodiment and may be changed. For example, the work path may not include the digging walls A4 and A5. Alternatively, the work path may not include the slots A1 to A3. The work path is not limited to use for digging and may be used for another work such as filling or the like.

The method for determining the work order is not limited to that of the above embodiment and may be changed. For example, the work on the third slot A3 may be performed subsequent to the work on the first slot A1. Alternatively, the work on the first digging wall A4 may be performed subsequent to the work on the second slot A2.

The controller 26 may control the work machine 1 so as to repeatedly perform work on the same work path until the work according to the target trajectory 70 is completed. For example, FIG. 12 illustrates an example when the work implement 13 does not reach the target trajectory 77 during digging of the second slot A2 in the second layer L2.

Figure 12:
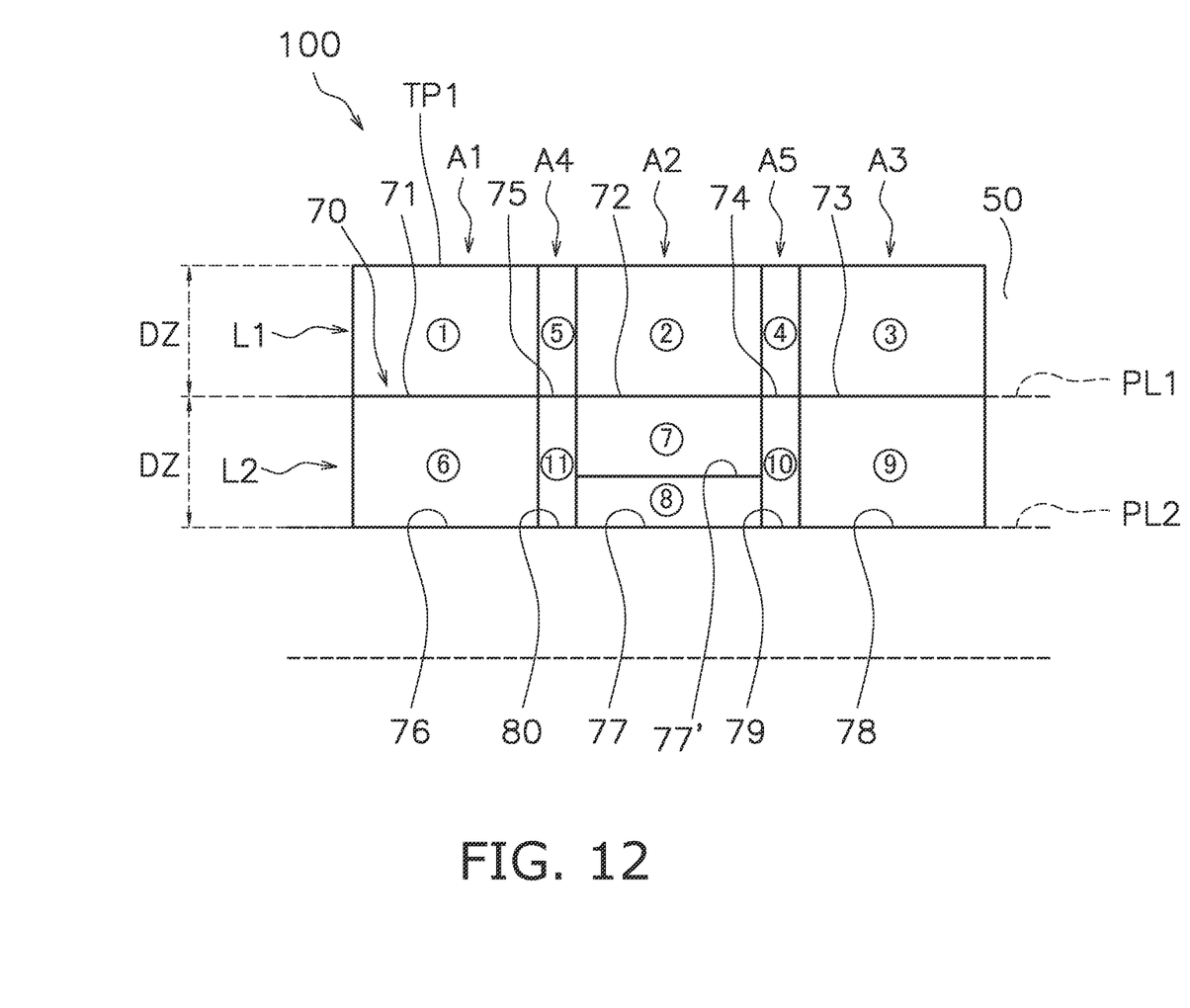
FIG. 12 is a view illustrating another example of processes by the controller.

As illustrated in FIG. 12, the controller 26 sixthly performs the work on the first slot A1 in the second layer L2 in the same manner as the above embodiment. Next, the controller 26 seventhly performs the work on the second slot A2 in the second layer L2. At this time, the work implement 13 does not reach the target trajectory 77 and a bottom 77' of the second slot A2 in the second layer L2 is shallower than a bottom of the first slot A1 in the second layer L2 (the target trajectory 76).

In this case, the controller 26 eighthly performs the work again on the second slot A2 in the second layer L2. That is, the controller 26 eighthly causes the work implement 13 to move according to the target trajectory 77 again. After the work according to the target trajectory 77 for the second slot A2 is completed by the eighth work, the controller 26 ninthly performs the work on the third slot A3. As a result, the depths of the slots A1 to A3 are aligned.

According to the present disclosure, the work order of the plurality of work paths is determined based on the work path data. Accordingly, the work on the plurality of work paths can be performed efficiently by the work machine.

The invention claimed is:

1. A control system for a work machine including a work implement, the control system comprising:
a processor configured to
acquire actual topography data indicative of an actual topography of a work site,
acquire work data including a width of the work implement, a slot width, and a wall width,
generate work path data based on the actual topography data and the work data, the work path data indicating positions of a plurality of work paths aligned in a lateral direction, the plurality of work paths including at least three slots and at least two digging walls positioned between adjacent pairs of the at least three slots, each of the at least three slots having a width equal to the slot width and each of the at least two digging walls having a width equal to the wall width, the work path data including type data indicating a type of work performed by the work machine and the type data including digging of the slots and digging of the digging wall,
acquire area data indicative of a work area including the plurality of work paths, and
determine a work order of the plurality of work paths based on the type data of the work path data so that work on the digging wall is performed after work on the at least three slots in the work area, and
control the work machine to perform work according to the work paths in the work order,
wherein
the at least three slots include a first slot positioned at one end of the work area and a farthest slot positioned at another end of the work area, the one end of the work area being spaced from the other end of the work area along the lateral direction,
the at least two digging walls include a first digging wall that is closest to the first slot and a farthest digging wall that is closest to the farthest slot along the lateral direction, and
the processor is further configured to determine the work order of the plurality of work paths such that
the at least three slots are worked in order from the first slot to the farthest slot, and
after the work on the at least three slots is completed, the at least two digging walls are worked in order from the farthest digging wall to the first digging wall such that the work on the at least two digging walls is conducted in the opposite order with respect to the lateral direction as the work on the at least three slots.

2. The control system for the work machine according to claim 1, wherein
the processor is further configured to
acquire target trajectory data indicative of a target trajectory, at least a portion of the target trajectory being positioned below the actual topography, and
control the work machine so that the work implement moves according to the target trajectory for each of the work paths.

3. The control system for the work machine according to claim 1, wherein
the processor is further configured to
determine the plurality of work paths in a plurality of layers positioned below a surface of the actual topography, and
determine the work order of the work paths in order from an upper layer between the plurality of layers.

4. The control system for the work machine according to claim 1, wherein
the processor is further configured to determine the at least three slots including the first slot and the farthest slot and the plurality of digging walls including the first digging wall and the farthest digging wall in a first layer positioned below a surface of the actual topography and in a second layer positioned below the first layer.

5. The control system for the work machine according to claim 4, wherein
the processor is further configured to determine the work order so that work on the first slot in the second layer is performed after the first digging wall in the first layer.

6. A method executed by a processor in order to control a work machine including a work implement, the method comprising:
acquiring actual topography data indicative of an actual topography of a work site;
acquiring work data including a width of the work implement, a slot width, and a wall width;
generating work path data based on the actual topography data and the work data, the work path data indicating positions of a plurality of work paths aligned in a lateral direction, the plurality of work paths including at least three slots and at least two digging walls positioned between adjacent pairs of the at least three slots, each of the at least three slots having a width equal to the slot width and each of the at least two digging walls having a width equal to the wall width, the work path data including type data indicating a type of work performed by the work machine and the type data including digging of the slots and digging of the digging wall;
acquiring area data indicative of a work area including the plurality of work paths;
determining a work order of the plurality of work paths based on the type data of the work path data so that work on the digging wall is performed after work on the plurality of at least three slots in the work area; and
controlling the work machine to perform work according to the work paths in the work order
wherein,
the at least three slots include a first slot positioned at one end of the work area and a farthest slot positioned at another end of the work area, the one end of the work area being spaced from the other end of the work area along the lateral direction,
the at least two digging walls include a first digging wall that is closest to the first slot and a farthest digging wall that is closest to the farthest slot along the lateral direction,
the work order of the plurality of work paths is determined such that
the at least three slots are worked in order from the first slot to the farthest slot, and
after the work on the at least three slots is completed, the at least two digging walls are worked in order from the farthest digging wall to the first digging wall such that the work on the at least two digging walls is conducted in the opposite order with respect to the lateral direction as the work on the at least three slots.

7. The method according to claim 6, further comprising:
acquiring target trajectory data indicative of a target trajectory, at least a portion of the target trajectory being positioned below the actual topography,
the controlling the work machine including controlling the work machine so that the work implement moves according to the target trajectory for each of the work paths.

8. The method according to claim 6, further comprising:
determining the plurality of work paths in a plurality of layers positioned below a surface of the actual topography,
the work order of the work paths being determined in order from an upper layer between the plurality of layers.

9. The method according to claim 6, further comprising:
determining the at least three slots including the first slot and the farthest slot and the plurality of digging walls including the first digging wall and the farthest digging wall in a first layer positioned below a surface of the actual topography and in a second layer positioned below the first layer.

10. The method according to claim 9, wherein
the work order is determined so that work on the first slot in the second layer is performed after the first digging wall in the first layer.

* * * * *